Dec. 29, 1942.                 M. LOPEZ                      2,306,452
      TEMPORARY SHUT-OFF FOR CHANGING VALVES AND PLUG COCKS IN PIPE LINES
                       Filed May 24, 1941           2 Sheets-Sheet 1
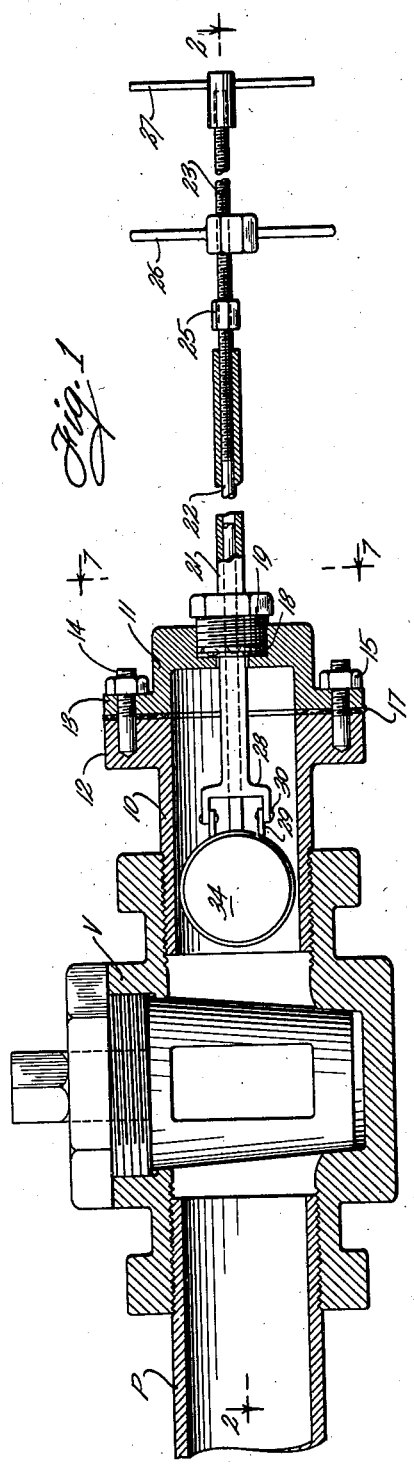
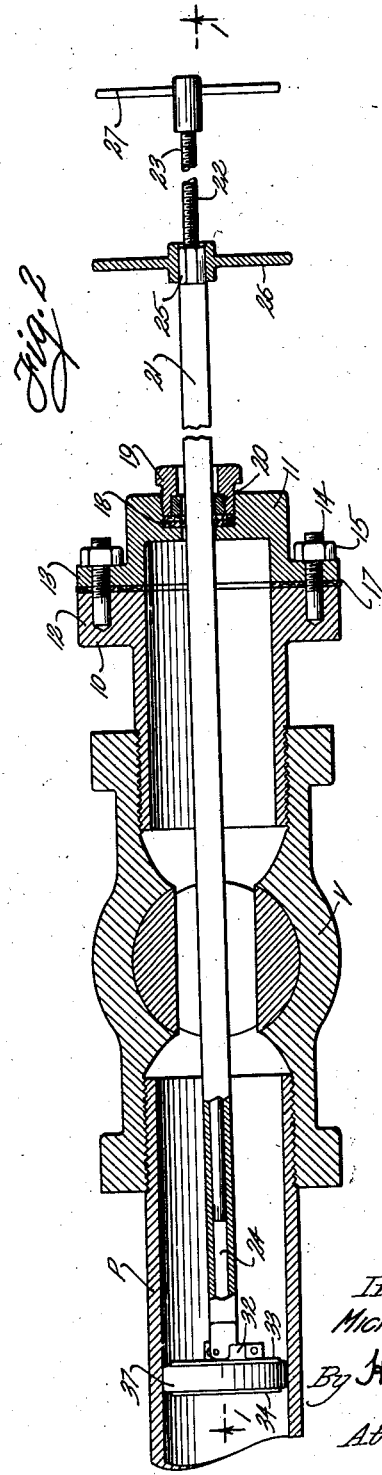
Inventor
MICHAEL LOPEZ
By Hazard and Miller
Attorneys

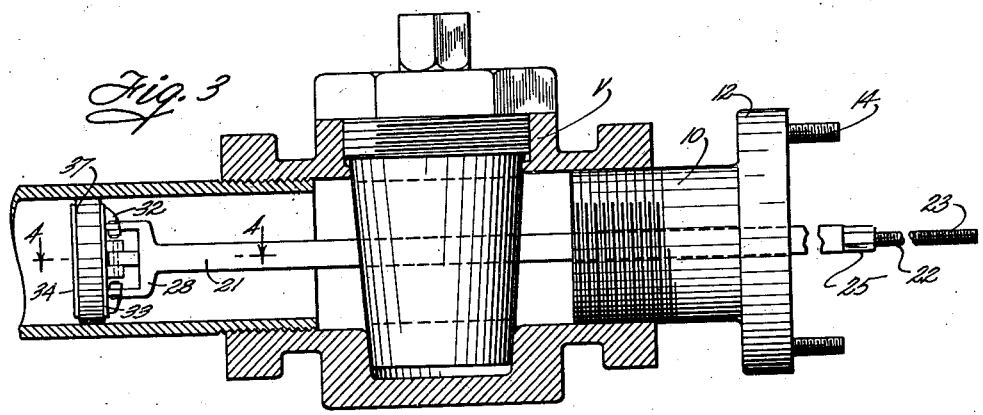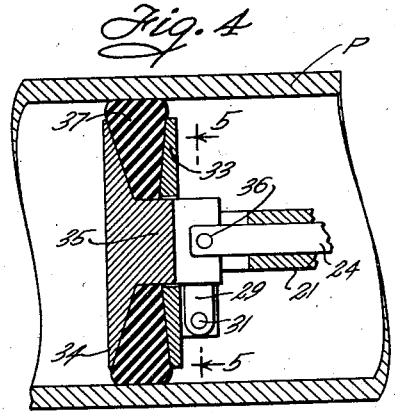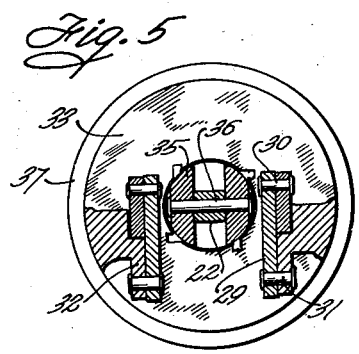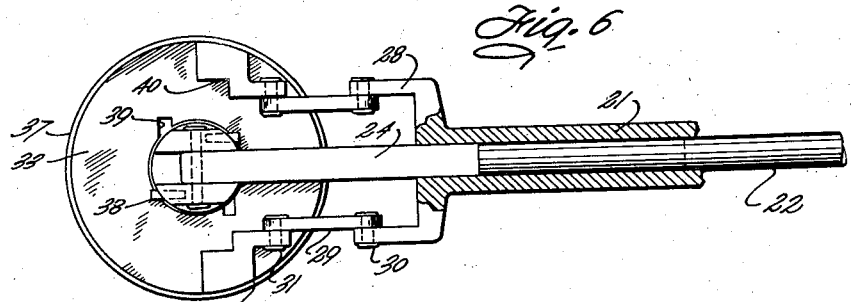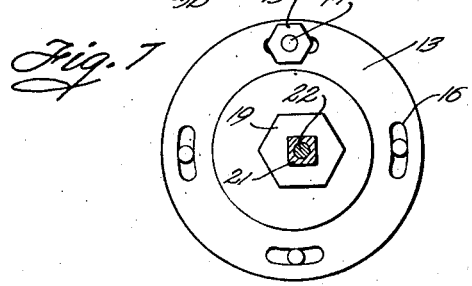

Patented Dec. 29, 1942

2,306,452

UNITED STATES PATENT OFFICE 2,306,452

TEMPORARY SHUTOFF FOR CHANGING VALVES AND PLUG COCKS IN PIPE LINES

Michael Lopez, Whittier, Calif., assignor of one-half to Gertrude Florence Rich, Whittier, Calif.

Application May 24, 1941, Serial No. 395,048

9 Claims. (Cl. 138—89)

This invention relates to a means for forming a temporary shut-off to enable and facilitate the removal and replacement of gate valves, plug cocks, and the like in pipe lines.

In pipe lines having gate valves, plug cocks, and the like incorporated therein necessity requires removal of such valves and plug cocks from time to time for inspection, cleaning, repair, and replacement purposes. In the case of pipe lines conveying gas it has heretofore been customary to provide an opening in the pipe line on the upstream or pressure side of the valve or plug cock that is to be removed and introduce through such an opening an inflatable bladder. This bladder is forced upstream from the opening and is inflated, expanding against the interior of the pipe line and thus forming a temporary plug or shut-off therein. Such inflatable bladders are subject to the disadvantage that if the interior of the pipe is rough or there is scale present that the bladder may be punctured on its being inflated thereagainst. It not frequently occurs that these bladders fail from mere deterioration. At all events their use is restricted to situations where the pressure that is being shut off does not exceed fifteen pounds per square inch. When the bladders have been installed the plug cock or valve located downstream therefrom can be removed, inspected, repaired, and replaced.

An object of the present invention is to provide an improved means for forming a temporary shut-off which can be introduced into the pipe line and fit in a position upstream from the valve or plug cock which avoids the necessity of providing an opening in the pipe line upstream from the valve or plug cock for its introduction.

Another object of the invention is to provide an expansible shut-off for use in pipe lines which does not require inflation and which can be expanded with great force against the interior of the pipe line to form a very effective shut-off which is not restricted in its use to situations where there are low pressures.

More specifically, an object of the invention is to provide a shut-off for use in pipe lines which has an expansible disc-like closure with operating means associated therewith whereby the disc-like closure can be introduced into the pipe line down stream of the valve or plug cock in a position wherein its plane is approximately parallel to the length of the pipe line. In this position, the disc-like closure can be moved through the valve or plug cock into a position upstream with relation thereto, then turned so that its plane is approximately right angles to the length of the pipe line and finally compressed and expanded against the interior of the pipe line to effect a closure. The parts associated with the closure are such as to effectively prevent any substantial amount of leakage and when the closure is installed they facilitate removal and replacement of the valve and plug cock.

With the foregoing and other objects in view, which will be made manifest in the following detailed description and specifically pointed out in the appended claims, reference is had to the accompanying drawings for an illustrative embodiment of the invention, wherein:

Figure 1 is a vertical section through a portion of a pipe line having incorporated therein a plug cock that it is desired to remove and replace illustrating that portion of the pipe line which is downstream of the plug cock as having been removed and the apparatus embodying the present invention as having been applied to the plug cock preparatory to the insertion of the closure;

Fig. 2 is a horizontal section taken substantially upon the line 2—2 upon Fig. 1, but illustrating the disc-like closure as having been introduced into the pipe line to assume a position at right angles thereto and upstream of the plug cock that is to be removed and replaced;

Fig. 3 is a view similar to Fig. 1, but illustrating the closure as having been expanded and set and the cap and handles of the device as having been removed preparatory to the removal of the plug cock from the pipe line;

Fig. 4 is a horizontal section taken substantially upon the line 4—4 upon Fig. 3;

Fig. 5 is a vertical section taken substantially upon the line 5—5 upon Fig. 4;

Fig. 6 is a partial view in side elevation, parts being broken away and shown in section, illustrating the details of construction of the closure and its connections with its operating rod and tube; and Fig. 7 is a sectional view taken substantially upon the line 7—7 upon Fig. 1.

Referring to the accompanying drawings wherein similar reference characters designate similar parts throughout, P indicates a pipe line in which is installed a plug cock or valve V which it is desired to remove and replace for cleaning, inspection, or repair purposes. The portion of the pipe line P illustrated is the upstream side of the pipe line. The downstream side that is normally connected to the opposite side of the valve V is illustrated as having been removed although prior to the application of the device embodying the present invention it will be understood that this pipe would normally be present.

When it is desired to remove the valve or plug cock V the valve or plug cock is first closed, as illustrated in Fig. 1, and one or more sections of pipe in the pipe line downstream therefrom are removed. The device that comprises the present invention consists of a housing formed of separable parts, one of such parts is indicated at 10 and the other of which is indicated at 11. These parts have companion flanges 12 and 13, respectively. The flange 12 has rigidly and permanently secured thereto threaded studs 14, to which are applicable nuts 15. These studs extend through arcuate slots 16 in the flange 13. The arcuate slots permit of slight rotary adjustment of the cap part 11 with relation to the body part 10 for a purpose as will hereinafter be explained. A suitable gasket 17 is normally positioned between the flanges.

Slightly off-center with relation to the center of cap 11 there is formed a suitable stuffing box consisting of packing 18 adapted to be compressed by a gland 19 within which there may be a ring 20 having a squared or non-circular opening therein. Extending through this stuffing box is a squared tube 21 within which there is telescopically arranged a rod 22 having one end threaded as at 23 and the other end squared as at 24 so as to fit the interior of the tube. On the threaded end of the rod there is a nut 25 to which is applicable the socket in a handle 26. This nut is adapted to be tightened against the end of tube 21 as clearly illustrated in Figs. 1 and 2. The extreme outer end of rod 22 is squared or rendered non-circular and is adapted to removably receive a socketed handle 27.

On the forward end of the tube 21 there is a fork 28 to which links 29 are pivotally connected as by rivets 30. These links, in turn, are pivotally connected as by rivets 31 to ears 32 formed on the rear side of a closure disc plate 33. Opposed to the closure disc plate 33 is a second closure disc plate 34 having a central hub 35 which extends rearwardly through the closure disc plate 33 and which is bifurcated to receive the forward end of rod 22. The rod 22 is pivotally connected to the hub 35 of the forward closure disc plate 34 as by a rivet 36. The two closure disc plates are opposed to each other and preferably present beveled faces between which is arranged compressible and expansible packing 37 which may be formed of rubber or the equivalent. Pins or bosses may be provided on the hub 35 as indicated at 38 and slots 39 capable of enabling these pins or bosses to pass therethrough are formed in the rear closure plate 33.

In assembling the disc-like closure made up of the two closure plates and the packing ring the two closure plates are rotated relatively to each other or at 90° from the position shown in Fig. 6 to permit the pins or bosses 38 to pass through the slots 39. They are then rotated relatively to each other so as to assume the relative position shown in Fig. 6. The links and pivot rivets 29, 30, 31, and 36 are then applied so that all parts are so connected together that there is little danger of any of the apparatus loosening or becoming detached while the construction is in the pipe line. It will be understood that the forward sides of the pins or bosses 38 bear against the rear side of the rear closure plate 33 when the parts are assembled.

The ends of the arms of the fork 28 are engageable with the rear side of the rear closure plate 33 when the closure plate has its plane position at substantially right angles to the length of the rod and the tube such engagement occurring at the areas 40.

The operation and advantages of the device are as follows: With the downstream sections of the pipe line removed, the housing or body part 10 is screwed into the downstream side of the body of the plug cock or valve. In the event that the casing of the valve is not equipped with threads but with a flange, then a companion flange is applied to the housing 10 and firmly attached thereto. This may be provided by a flanged collar, not shown, which is screwed onto the threaded end of the body part 10. The flange of the collar is equipped with bolt holes complementary to the bolt holes in the flange of the valve or plug cocks.

When the housing or body is applied to the downstream end of the valve as illustrated in Fig. 1, the disc-like closure is in its retracted position disposed entirely within the housing and occupying a position wherein its plane is substantially parallel to the lengths of the tube 21 and the rod 22.

The valve or plug cock is then opened and although there may be high pressure in the pipe line on the upstream side of the valve such pressure cannot cannot escape to any great extent because of the presence of the cap member 11 and the stuffing box surrounding a tube 21. The tube 21 and the rod 22 are then pushed forwardly so as to pass the disc-like closure through the open valve or plug cock and position it in the upstream portion of the pipe line. As above noted from an inspection of Fig. 7, the stuffing box is slightly off-center with respect to cap 11 so that when the closure is in the parallel position shown in Fig. 1, it will be so positioned as to pass through the center of the opening formed in the plug of the plug cock.

On reaching the desired position in the upsteam portion of the pipe line, rod 22 is pulled relatively to tube 21 which causes the disc-like closure to pivot or to be swung from the parallel position at right angles thereto or to a position as shown in Fig. 2. The pulling of the rod 22 is transmitted to the closure through the rivet 36 the links 29 permitting such turning movement which is finally arrested by areas 40 engaging the ends of the arms of the fork 28. The socketed handle 26 is then applied to nut 25 and the nut is screwed tightly against the end of tube 21 imposing considerable additional tension on rod 22. This additional tension is transmitted through rivet 36 to the closure plate 24 drawing this closure plate toward its opposed closure plate 33 and compressing or squeezing the packing ring 37 causing it to radially expand into tight sealing engagement with the interior of the pipe line P, thus forming a temporary closure upstream of the valve. Sufficient force may be imposed in this manner to seat the closure disc so as to withstand any ordinary pressures.

It is not essential that the stuffing box 18 be absolutely leakproof. On the contrary it is desirable that a small amount of leakage be permitted through the stuffing box. In the event that the interior of the pipe line P is so rough that a leakproof seal cannot be formed by the radially expanded packing ring 37, such leakage may escape through the leaking stuffing box and detected by applying a soap solution around the stuffing box. If the soap solution indicates that leakage is present around the seated closure disc the closure disc is loosened and moved to a different locality in the pipe line wherein a leakproof sealing engagement can be secured.

When the closure disc has been seated and it is determined from the application of the soap solution around the stuffing box that no leakage is present the handles 26 and 27 are removed, the nuts 15 are removed, and the cap member 11 of the housing is withdrawn by sliding it rearwardly over the projecting portion of tube 21 leaving the apparatus in the condition illustrated in Fig. 3. The valve or plug cock V can then be unscrewed or detached from pipe line P and when detached it is removed by withdrawing it over tube 21 and rod 22. It may then be inspected, cleaned, repaired, or replaced. In replacing the valve, the valve is opened and slid over the projecting portions of the tube 21 and rod 22 and connected to the pipe line P. The cap member 11 is re-applied and tightened in place by applying the nuts to the threaded studs 14. The handles 26 and 27 are re-applied to the nut 25 and rod 22, respectively, and the nut 25 is loosened thus loosening the opposed closure plates 33 and 34. By moving the rod 22 forwardly with respect to tube 21 the closure disc is turned from its transverse position shown in Fig. 2 into the parallel position shown in Fig. 1, and in this position the closure may be retracted back into the housing by drawing the tube 21 and rod 22 rearwardly. The valve can then be closed, the housing or body detached from the valve, and the downstream portions of the pipe line replaced and connected to the valve. Thereupon the valve may be opened and the pipe line again placed in service.

If the valve in the pipe line is a gate valve ordinarily the seats for the gate are of such diameter that the closure disc can be passed therethrough while in its transverse position. In the case of such valves, the pivoting or turning of the closure disc is unnecessary. In the case of plug cocks, however, such as that illustrated, the opening through the plug has less width than the internal diameter of the pipe line and in this situation it is necessary to have the closure disc capable of assuming a position wherein its plane is approximately parallel to the length of the rod and tube so that it may be passed through this narrow opening in the plug and then turned into a transverse position for seating in the pipe line.

From the above-described construction it will be appreciated that a novel, simple, durable, and advantageous means is provided for effecting a temporary shut-off in pipe lines to facilitate removal and replacement of valves therein. It is unnecessary to provide any opening in the upstream side of the pipe line for the insertion of the closure and when the closure is properly seated, it is capable of shutting off pressures greatly in excess of those capable of being shut off by inflatable bladders and the like. By means of the invention the closure providing means is introduced into the pipe line in the downstream side of the valve moved through the valve into the upstream side of the pipe line and seated therein regardless of the fact that the valve or plug cock may have an opening therein of less width than the internal diameter of the pipe line.

Various changes may be made in the details of construction without departing from the spirit or scope of the invention as defined by the appended claims.

We claim:

1. Means for forming temporary shut-off in pipe lines including a disc-like closure adapted to be inserted in a pipe line, a tube, a rod telescopically disposed therein, and means pivotally connecting the rod and tube to the closure whereby the closure may assume a position wherein its plane is approximately parallel to the length of the rod and tube for insertion purposes or a position approximately at right angles thereto upon manipulation of the rod relatively to the tube.

2. Means for forming a temporary shut-off in pipe lines including a disc-like closure adapted to be inserted in a pipe line, a tube, a rod telescopically disposed therein, means pivotally connecting the closure to the rod, and links pivotally connected to the closure and to the tube whereby the closure may assume a position wherein its plane is approximately parallel to the length of the rod and tube for insertion purposes or a position approximately at right angles thereto upon manipulation of the rod relatively to the tube.

3. Means for forming a temporary shut-off in pipe lines including a disc-like closure formed of opposed parts movable toward and away from each other, compressible and expansible packing between the parts, a rod and tube telescopically arranged, means pivotally connecting one of said parts to the tube, and means pivotally connecting the other of said parts to the rod whereby the closure may assume a position wherein its plane is approximately parallel to the length of the rod and tube or a position at right angles thereto upon manipulation of the rod relatively to the tube, and upon pulling the rod relatively to the tube the opposed parts will be forced to compress and expand the packing.

4. Means for forming a temporary shut-off in pipe lines including a disc-like closure formed of opposed parts movable toward and away from each other, compressible and expansible packing between the parts, a rod and tube telescopically arranged, links pivotally connected to one of said parts and to the tube, means pivotally connecting the other of said parts to the rod whereby the closure may assume a position wherein its plane is approximately parallel to the length of the rod and tube or positioned at right angles thereto upon manipulation of the rod relatively to the tube, and upon pulling the rod relatively to the tube the opposed parts will be forced to compress and expand the packing.

5. Means for forming a temporary shut-off in pipe lines including a disc-like closure formed of opposed parts movable toward and away from each other, compressible and expansible packing between the parts, a rod and tube telescopically arranged, links pivotally connected to one of said parts and to the tube, means pivotally connecting the other of said parts to the rod whereby the closure may assume a position wherein its plane is approximately parallel to the length of the rod and tube or positioned at right angles thereto upon manipulation of the rod relatively to the tube, and upon pulling the rod relatively to the tube the opposed parts will be forced to compress and expand the packing, and means for pulling the rod relatively to the tube.

6. Means for forming a temporary shut-off in pipe lines comprising a housing formed of the separable parts normally attached together, one part providing a cap and the other being attachable to a plug cock, gate valve, or the like in the pipe line, a rod and tube telescopically arranged and adjustable through said cap, an expansible disc-like closure, means pivotally connecting the closure to the rod, and means pivotally connecting the closure to the tube whereby the closure may be moved by the rod and tube from within the housing to the interior of the pipe line in a position wherein the closure is in a plane approximately parallel to the length of the rod and tube, then turned into a position at approximately right angles thereto and expanded into engagement with the interior of the pipe line by manipulation of the rod and tube relatively to each other.

7. Means for forming a temporary shut-off in pipe lines comprising a housing formed of separable parts normally attached together, one part providing a cap and the other being attachable to a plug cock, gate valve, or the like in the pipe line, a rod and tube telescopically arranged and adjustable through said cap, an expansible disclike closure having opposed parts movable toward and away from each other, compressible and expansible packing between the parts, means pivotally connecting one part to the rod and links pivotally connected to the other part and to the tube whereby the closure may be moved by the rod and tube from within the housing to the interior of the pipe line in a position wherein the closure is in a plane approximately parallel to the length of the rod and tube, then turned into a position at approximately right angles thereto and the packing compressed and expanded into engagement with the interior of the pipe line by manipulation of the rod and tube relatively to each other.

8. Means for forming a temporary shut-off in pipe lines comprising a housing formed of separable parts, one of which provides a cap and the other of which is attachable to a part in the pipe line, an expansible closure retractible into the housing and means slidable through the cap for projecting the closure from the housing into the pipe line in a position approximately parallel to the length of the pipe line, then turning the closure so as to be substantially transverse with respect thereto and finally expanding the closure into engagement with the interior of the pipe line.

9. Means for forming a temporary shut-off in pipe lines comprising a housing attachable to a part in the pipe line, an expansible closure retractible into the housing, and means slidable through a wall of the housing for projecting the closure from the housing into the pipe line in a position approximately parallel to the length of the pipe line, then turning the closure so as to be substantially transverse with respect to the pipe line and finally expanding the closure into engagement with the interior of the pipe line.

MICHAEL LOPEZ.